J. MELLINGER.
HARROW.

No. 108,279. Patented Oct. 11, 1870.

Witnesses.
Jos. J. Payton
Baltis De Long.

Inventor.
John Mellinger
by his Attorney
Wm. D. Baldwin

2 Sheets—Sheet 2.

J. MELLINGER.
HARROW.

No. 108,279. Patented Oct. 11, 1870.

Witnesses
Joe Heyton
Baltis De Long

Inventor.
John Mellinger
by his Attorney
Wm D. Baldwin

United States Patent Office.

JOHN MELLINGER, OF GREENSBURG, PENNSYLVANIA.

Letters Patent No. 108,279, dated October 11, 1870.

IMPROVEMENT IN HARROWS.

The Schedule referred to in these Letters Patent and making part of the same.

*To all whom it may concern:*

Be it known that I, JOHN MELLINGER, of Greensburg, in the county of Westmoreland and State of Pennsylvania, have invented certain new and useful Improvements in Harrows, of which the following is a full, clear, and exact description.

My invention relates to a harrow, of the class which is suspended from a carriage when at work, and supported by it clear of the ground when being moved from place to place.

My improvements consist—

First, in the construction and arrangement, as hereinafter set forth, of a carriage mounted on two wheels, a harrow formed of two symmetrical parts or wings, hinged together, and composed each of a longitudinal piece, from which side pieces diverge and extend beyond the wheels of the carriage, from which the harrow is suspended, both before and behind them, and having braces extending between the side pieces inside the wheels, and lifting-levers connected with the harrow by flexible connections.

Second, in the construction and arrangement, as hereinafter set forth, of the harrow, the carriage, the lifting-levers, and the adjustable or sliding seat for the driver, whereby the carriage may be properly balanced by the driver, both when working and when the harrow is raised from the ground.

In the accompanying drawing—

Figure 1:
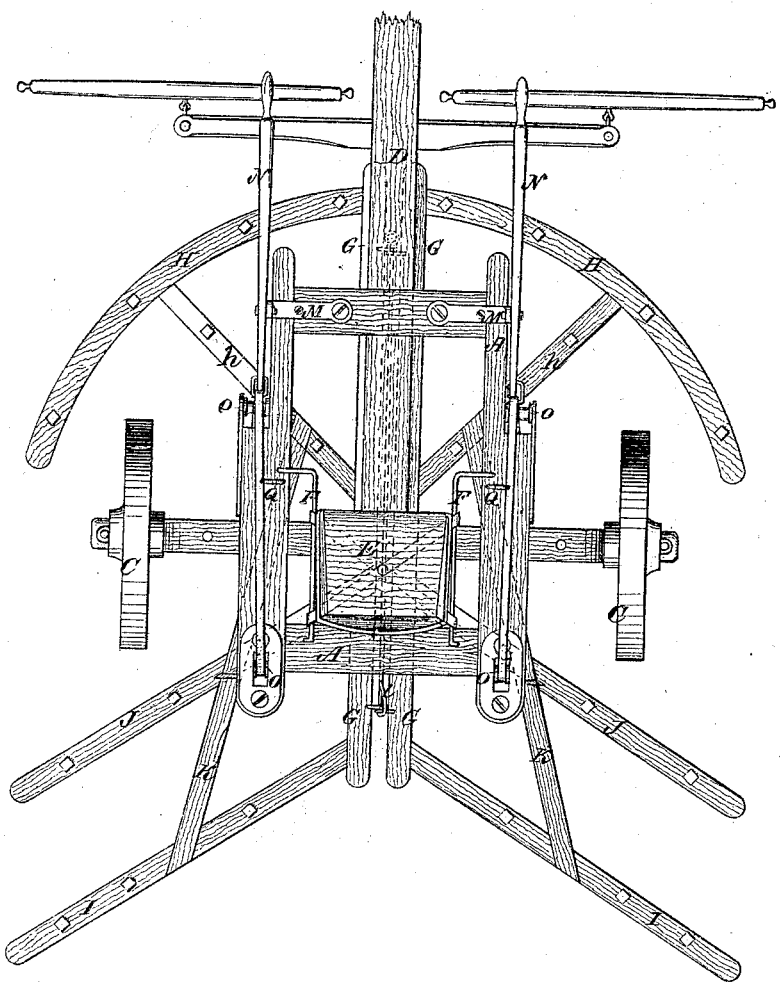
Figure 2:
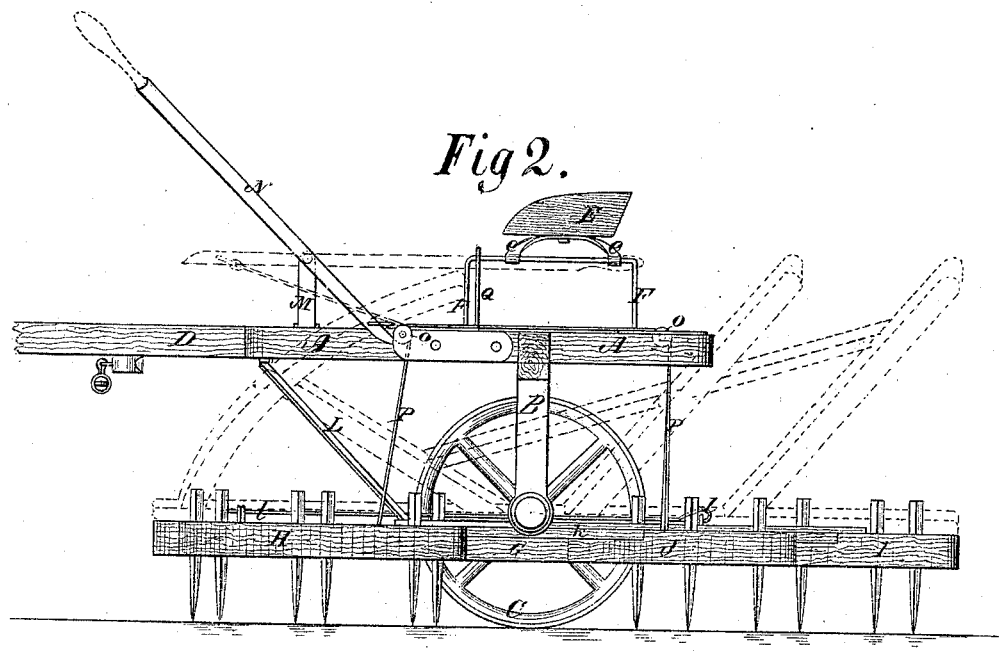

Figure 1 is a plan or top view of my harrow;
Figure 2, a side elevation; and
Figure 3 a rear elevation of the same.

A skeleton frame, A, is mounted upon a cranked axle, B, supported upon wheels C C.

A tongue, D, projects centrally from the frame, to which it is rigidly attached, and is provided with double and single-trees, for the attachment of the team.

A driver's seat, E, is secured to springs e, the ends of which are bent and fit around guide-rails F, secured to the frame, and spanning the axle.

The seat may be moved either backward or forward upon the rails, as desired, to balance the machine upon the wheels.

The harrow is composed of two parts, correspondingly constructed, and hinged together beneath the carriage in line with the tongue.

Each wing is formed of a stout longitudinal piece, G, from the front end of each of which projects a curved side piece, H, each extending out beyond the wheel, on its side of the machine, and reaching back about far enough to bring its rear end in line with the axle.

A brace, h, extends from each piece G to the middle of each of the curved pieces H, to give them strength, and, at the same time, admit of more teeth being employed, each brace in this instance carrying two teeth.

From the rear end of each piece G projects a rear side piece, I, inclining backward, and in advance of these are corresponding pieces J.

On each wing a brace-bar, K, connects the rear side pieces I J and the front brace h.

By this construction, I produce a strong frame, which projects beyond the wheels in front and rear, but, at the same time, does not inclose them, there being no connection between the rear and front side pieces, outside of the wheels, which may be taken off the axles without obstruction from the harrow-frame.

The wings are suspended from the carriage by drag-chains L L L' L', the two former being, in this instance, attached to the pieces G G, and the latter to a rod, l, which passes through eye-bolts on the pieces G G, to form the hinge which unites the wings.

Upon each front corner of the frame A is secured a bracket-standard, M, to each end of which is pivoted a lever, N.

Two pulleys, O O, are secured, in suitable bearings, one near each rear corner of the frame, and a similar pulley, o, is mounted on each side of the frame, in front of the axle.

Chains or cords P are secured to the harrow-wings, one to each wing in front of the axle, and nearly beneath the front pulleys, and one to each wing in rear of the axle, and nearly beneath the rear pulleys.

The chains pass over the pulleys O O o o, and are attached together to the lower parts of their respective levers N N.

Figure 3:
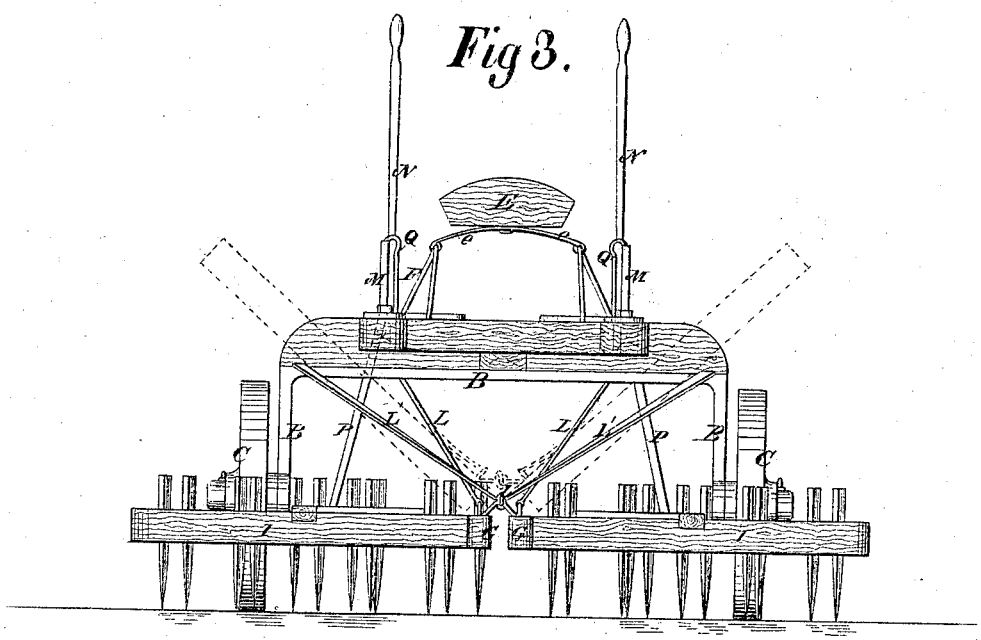

The driver from the seat can raise either or both wings by means of the levers to the position shown in dotted lines in figs. 2 and 3 of the drawings, and, when so elevated, the wings are retained in that position by means of spring-hooked rods or catches Q Q, which hold the levers until released by the driver.

When the wings are raised for the transportation of the machine, the driver moves his seat forward to keep the machine balanced, as the rear portion of the harrow is of greatest weight, and extends furthest from the center of the axle.

What I claim is—

1. The construction and relative arrangement, as described, of the carriage, the hinged, symmetrical, sectional harrow-frame, suspended and braced between the wheels, but projecting beyond them, both in front and rear, the flexible connections, and the lifting-levers.

2. The construction and arrangement of the carriage, the hinged, sectional harrow-frame, the lifting-levers, and the adjustable driver's seat, as set forth.

In testimony whereof, I have hereunto subscribed my name.

JOHN MELLINGER.

Witnesses:
JAMES FREES,
WILLIAM McQUAIDE.